(12) United States Patent
Yoshizawa

(10) Patent No.: US 6,209,900 B1
(45) Date of Patent: Apr. 3, 2001

(54) CYCLE PROVIDED WITH A MOVING FULCRUM TYPE LEVERAGE

(75) Inventor: Yasuo Yoshizawa, Yonezawa (JP)

(73) Assignee: Yoshiki Industrial Co., Ltd., Yonezawa (JP)

(*) Notice: Subject to any disclaimer, the term of this patent is extended or adjusted under 35 U.S.C. 154(b) by 0 days.

(21) Appl. No.: 09/085,885

(22) Filed: May 27, 1998

(30) Foreign Application Priority Data

Jul. 18, 1997 (JP) .................................................. 9-193952
Nov. 28, 1997 (JP) .................................................. 9-329092

(51) Int. Cl.[7] .................................................. B62M 1/04
(52) U.S. Cl. .................................................. 280/252; 280/256
(58) Field of Search .................................................. 280/253, 254, 280/255, 256, 257, 258, 252

(56) References Cited

U.S. PATENT DOCUMENTS

| | | | |
|---|---|---|---|
| 584,808 | * 6/1897 | Young | 280/256 |
| 594,980 | * 12/1897 | Booth et al. | 280/256 |
| 609,498 | * 8/1898 | Campbell | 280/257 |
| 776,651 | * 12/1904 | Greenison | 280/256 |
| 1,427,589 | * 8/1922 | Greenison | 280/256 |
| 1,505,271 | * 8/1924 | McNeil | 280/256 |
| 1,509,898 | * 9/1924 | McConnell | 280/258 |
| 1,577,585 | * 3/1926 | Montiglio | 280/254 |
| 2,424,639 | * 7/1947 | Sobirai | 280/257 |
| 4,560,182 | * 12/1985 | Yamaguchi | 280/257 |
| 4,564,206 | * 1/1986 | Lenhardt | 280/252 |
| 4,577,879 | * 3/1986 | Vereyken | 280/256 |
| 5,405,157 | * 4/1995 | Bezerra et al. | 280/257 |

FOREIGN PATENT DOCUMENTS 57-209482 12/1982 (JP) .
5-288248 11/1993 (JP) .

* cited by examiner

Primary Examiner—Kevin Hurley
Assistant Examiner—Andrew J. Fischer
(74) Attorney, Agent, or Firm—Frishauf, Holtz, Goodman, Langer & Chick, P.C.

(57) ABSTRACT

A pedal arm as a lever member is supported at its fulcrum by a roller, which is held for movement in a guide groove. A crank pin in an eccentric position on a gear is coupled to the point of action of the pedal arm, whereby the rotation of the gear is transmitted to a rear wheel.

3 Claims, 13 Drawing Sheets

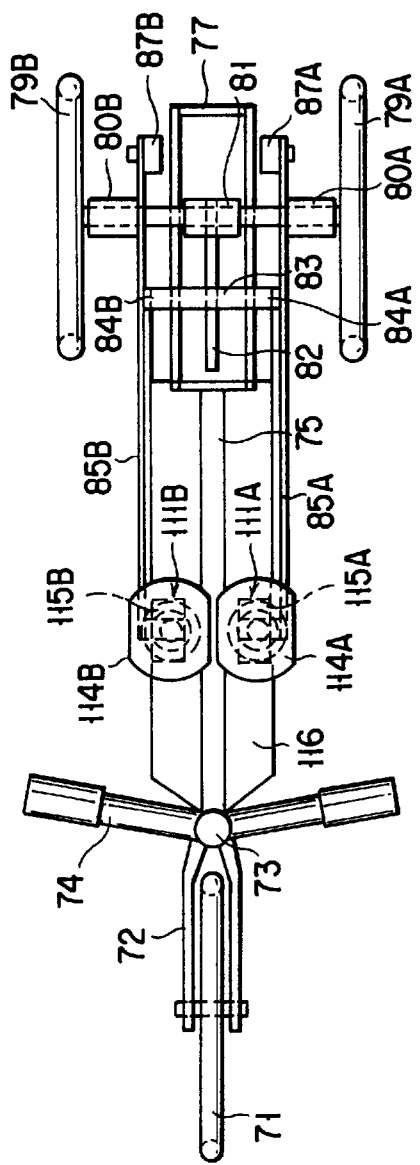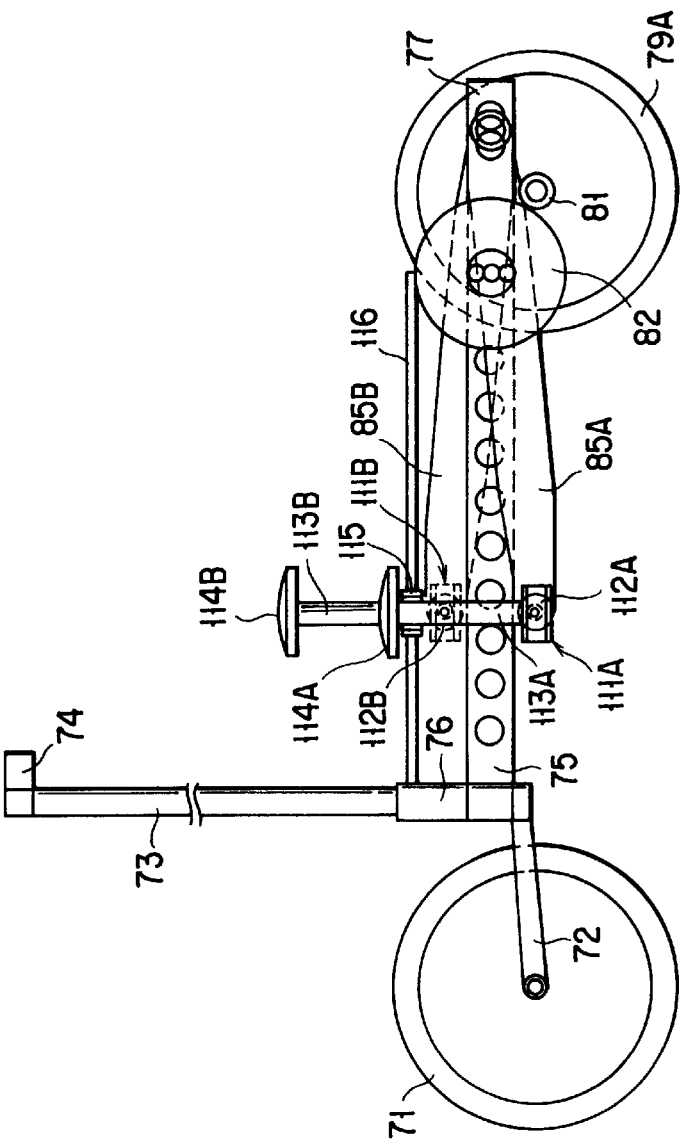
FIG. 8A
FIG. 8B

CYCLE PROVIDED WITH A MOVING FULCRUM TYPE LEVERAGE

BACKGROUND OF THE INVENTION

The present invention relates to a land-use cycle provided with a moving fulcrum type leverage and adapted to be propelled by human power, e.g., by foot operation.

A conventional bicycle is designed so that a user can rotate a chain gear by alternately working cranked pedals, which are fixed individually to the opposite sides of the shaft of the chain gear with a phase difference of 180 degrees, by both his feet and transmit this rotation to a rear wheel by means of a chain, thereby propelling the bicycle.

A torque generated in the shaft of the chain gear can be represented by the product of the distance from the shaft to each pedal and a force in the direction of a tangent to the path of rotation of each pedal. Since the strength of a user's leg is limited, the distance from the shaft of the chain gear to each pedal must be made relatively long in order to increase the torque.

Since the diameter of the path of rotation of each pedal of the conventional bicycle is settled on the basis of the length of a standard user's leg, however, it is so hard to work the pedals that the operating efficiency and stability are poor if the diameter of the path is made longer than the existing one.

Moreover, the chain, which is used to transmit the rotation of the chain gear to the rear wheel, may possibly be disengaged from the chain gear or broken, so that it is awkward to handle and requires use of an all-over cover, thus involving a lot of problems.

BRIEF SUMMARY OF THE INVENTION

Accordingly, the object of the present invention is to provide a cycle with a moving fulcrum type leverage, which can produce a necessary propulsive force more easily than conventional cycles despite the omission of a chain.

A bicycle according to the present invention comprises: a frame including a handlebar; first and second wheels mounted individually on the front and rear portions of the frame for rotation; first and second support members movable along the inside of the first and second guide members, respectively; first and second lever members extending in the horizontal direction and having moving fulcrums supported individually on the first and second moving support members; first and second pedals formed on the respective force points of application of the first and second lever members, respectively; first and second crank devices connected to the respective points of action of the first and second lever members and coupled to an output shaft with a phase difference of 180 degrees from each other with respect to the output shaft; and a gear device coupling the output shaft to the hub spindle of one of the first and second wheels, the gear device including a transmission gear unit, and the frame having thereon a changing device for changing the gear ratio of the transmission gear unit and a brake device for limiting the rotation of the first and second wheels.

Further, a tricycle according to the invention comprises: a tricycle body including one steerable front wheel connected directly to a handlebar and two rear wheels connected to each other by means of a rear-wheel spindle; a rear-wheel gear fixed on the rear-wheel spindle; first and second crank pins arranged individually in eccentric positions symmetrical with respect to the center of the rear-wheel gear; first and second lever members rotatably mounted on the first and second crank pins as points of action, respectively; first and second pedals rotatably mounted on the front end portions of the first and second lever members, respectively; first and second rollers rotatably mounted on the rear end portions of the first and second lever members, respectively; and first and second guide members holding the first and second rollers for longitudinal movement and constituting moving fulcrums, the rear-wheel gear including a transmission gear unit, and the tricycle body having thereon a changing device for changing the gear ratio of the transmission gear unit and a brake device for limiting the rotation of at least one of the wheels.

Furthermore, a hand-operated bicycle according to the invention comprises: a frame; at least one front wheel and at least one rear wheel rotatably mounted on the frame; a rear-wheel gear fixed on the spindle of the rear wheel; a crankshaft provided in a position eccentric to the rear-wheel gear; a lever member rotatably mounted on the crankshaft as a point of action; a grip portion formed on a point of application on the front end of the lever member; a roller rotatably mounted on a fulcrum on the rear end of the lever member; and a guide member for holding the roller for longitudinal movement.

Another bicycle according to the invention comprises: a bicycle body including one steerable front wheel connected directly to a handlebar and at least one rear wheel connected on a rear-wheel spindle; a rear-wheel gear fixed on the rear-wheel spindle; a driving gear in mesh with the rear-wheel gear; first and second crank pins arranged individually in eccentric positions symmetrical with respect to the center of the driving gear; first and second lever members rotatably mounted on the first and second crank pins as points of action, respectively; first and second force application-point rollers rotatably mounted in positions corresponding to points of application on the front end portions of the first and second lever members, respectively; first and second fulcrum rollers rotatably mounted on the rear end portions of the first and second lever members, respectively; first and second application-point guide members for holding the first and second application-point rollers in order to constitute a moving application-point regulator in conjunction with the first and second application-point rollers; first and second fulcrum guide members for holding the first and second fulcrum rollers in order to constitute a moving fulcrum regulator in conjunction with the first and second fulcrum rollers; first and second piston rods vertically fixed to the first and second application-point guide members, respectively; and first and second pedal plates mounted on the upper ends of the first and second piston rods, respectively.

Thus, there may be provided cycles with a moving fulcrum type leverage in which a propulsive force can be obtained more easily and steadily than in conventional cycles without using a chain and without substantially changing the length of the stroke of feet or hands.

Additional object and advantages of the invention will be set forth in the description which follows, and in part will be obvious from the description, or may be learned by practice of the invention.

The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A and 8B are a plan view and a side view, respectively, showing a further embodiment of the invention;

DETAILED DESCRIPTION OF THE INVENTION

Preferred embodiments of the present invention will now be described with reference to the accompanying drawings.

Figure 1:
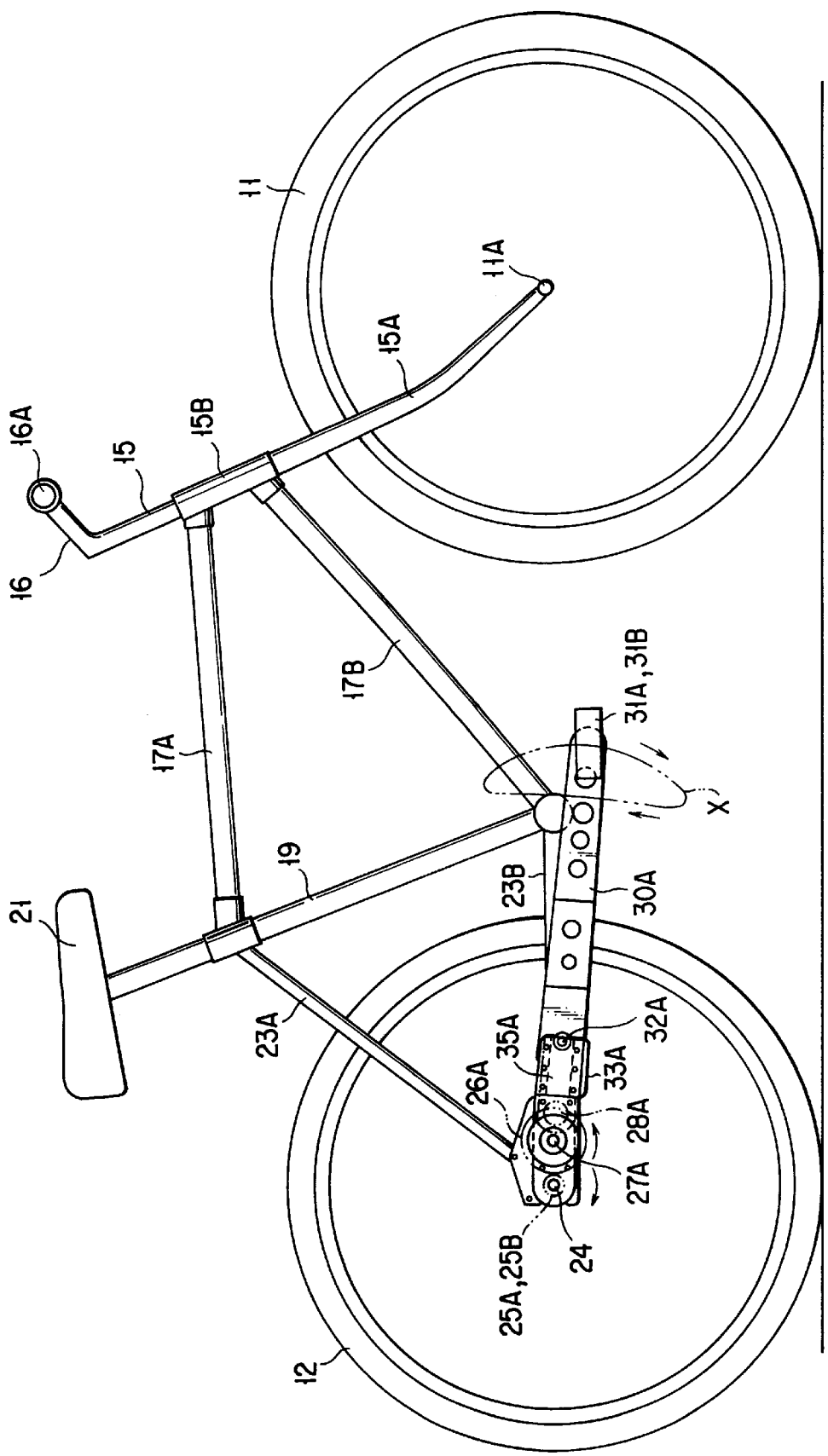
FIG. 1 is a side view schematically showing an arrangement of a bicycle according to an embodiment of the present invention.

FIG. 1 is a side view schematically showing an arrangement of a bicycle according to an embodiment of the invention. In the bicycle of FIG. 1, a front wheel 11 and a rear wheel 12, like those of a conventional bicycle, have the same diameter. If necessary, however, the respective diameters of the front and rear wheels 11 and 12 may be adjusted to different values.

A hub spindle 11A of the front wheel 11 is fixed to the distal end of a fork portion 15A that forms the lower half of a vertical frame 15, and a horizontal handlebar 16 as a steering device, having handgrips 16A thereon, is fixed to the upper end of the frame 15.

Two center frames 17A and 17B extend horizontally and downwardly, respectively, from a holding portion 15B for rotatably holding the vertical frame 15. A saddle frame 19 is mounted on the respective rear ends of the frames 17A and 17B so as to extend substantially parallel to the vertical frame 15. The saddle frame 19 may be made as a double-piped structure, so that the height of a saddle 21, which is mounted on the upper end of the saddle frame 19, can be adjusted as required by means of an adjusting screw (not shown). The vertical frame 15 is rotatably held by means of the holding portion 15B at the junction between the two center frames 17A and 17B, so that the course of the bicycle can be changed freely by manipulating the handlebar 16.

Figure 2:
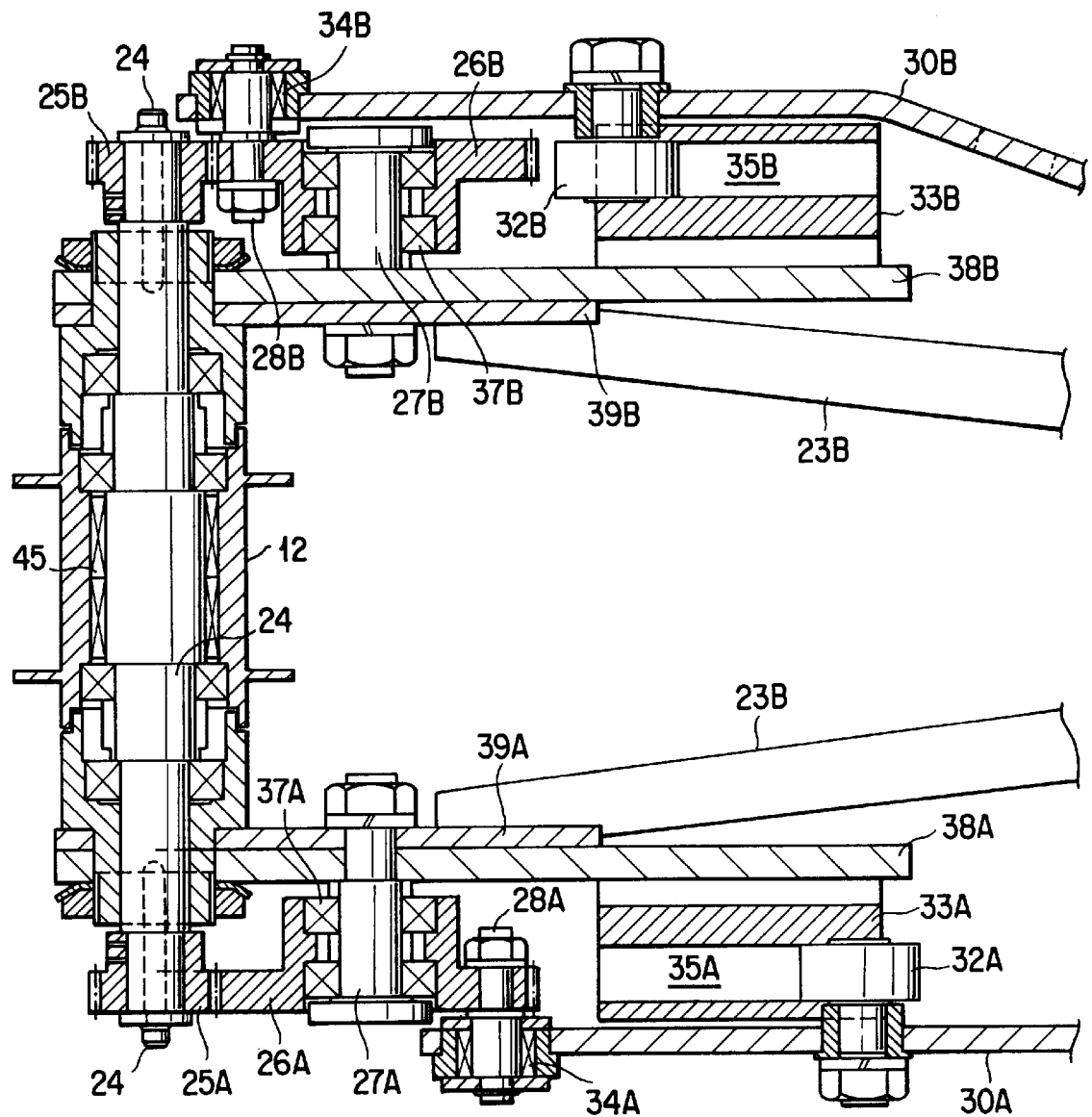
FIG. 2 is a detailed plan view of a drive mechanism at a rear portion of the bicycle of FIG. 1.

Further, as shown in FIG. 2, two rear frames 23A and 23B extend individually from the respective rear ends of the center frames 17A and 17B. The respective rear ends of the frames 23A and 23B are coupled together, and serve to keep a hub spindle 24 of the rear wheel 12 horizontal. Gears 25A and 25B are fixed individually to the opposite ends of the spindle 24. FIG. 1 shows an arrangement associated with a gear 25A on the right-hand side of the bicycle with respect to its course. The rear wheel 12 and the spindle 24 are connected to each other by means of a one-way clutch 45, which will be described later with reference to FIG. 2.

The gear 25A is in mesh with a gear 26A with a larger diameter. A crank pin 28A is attached to the gear 26A in a position eccentric to a shaft 27A of the gear 26A. Further, the rear end portion of a right-hand pedal arm 30A is rockably supported on the pin 28A.

A right-hand pedal 31A is rotatably mounted on the front end portion of the pedal arm 30A, while a roller 32A is rotatably supported in a position on the rear portion of the arm 30A. The roller 32A can freely move back and forth in a guide groove 35A in a support member 33A. Referring to FIG. 2, an arrangement of this portion will be described further in detail.

The pedal arm 30A constitutes a lever of which the fulcrum is located on a point at which the arm 30A is supported on the roller 32A. When the pedal 31A, a point of action application, is worked, it makes a flat rotatory motion within an angular range of about 35 degrees about the hub 24 while moving for the arrowed stroke in the clockwise direction along a flat semicircular path X.

Thereupon, the rear end of the pedal arm 30A, as a point of action, causes the crank pin 28A to rotate the gear 26A counterclockwise around its shaft 27A. As this is done, the shaft of the roller 32A, as a moving fulcrum, reciprocates back and forth in the guide groove 35A.

As the gear 26A thus rotates in the counterclockwise direction, the right-hand rear-wheel gear 25A is rotated clockwise, so that the rear wheel 12 rotates in the clockwise direction, and therefore, the bicycle advances.

A left-hand pedal arm 30B is provided with a similar propelling mechanism. Thus, the bicycle can be easily run by alternately working the right-hand pedal 31A and a left-hand pedal 31B.

Figure 3:
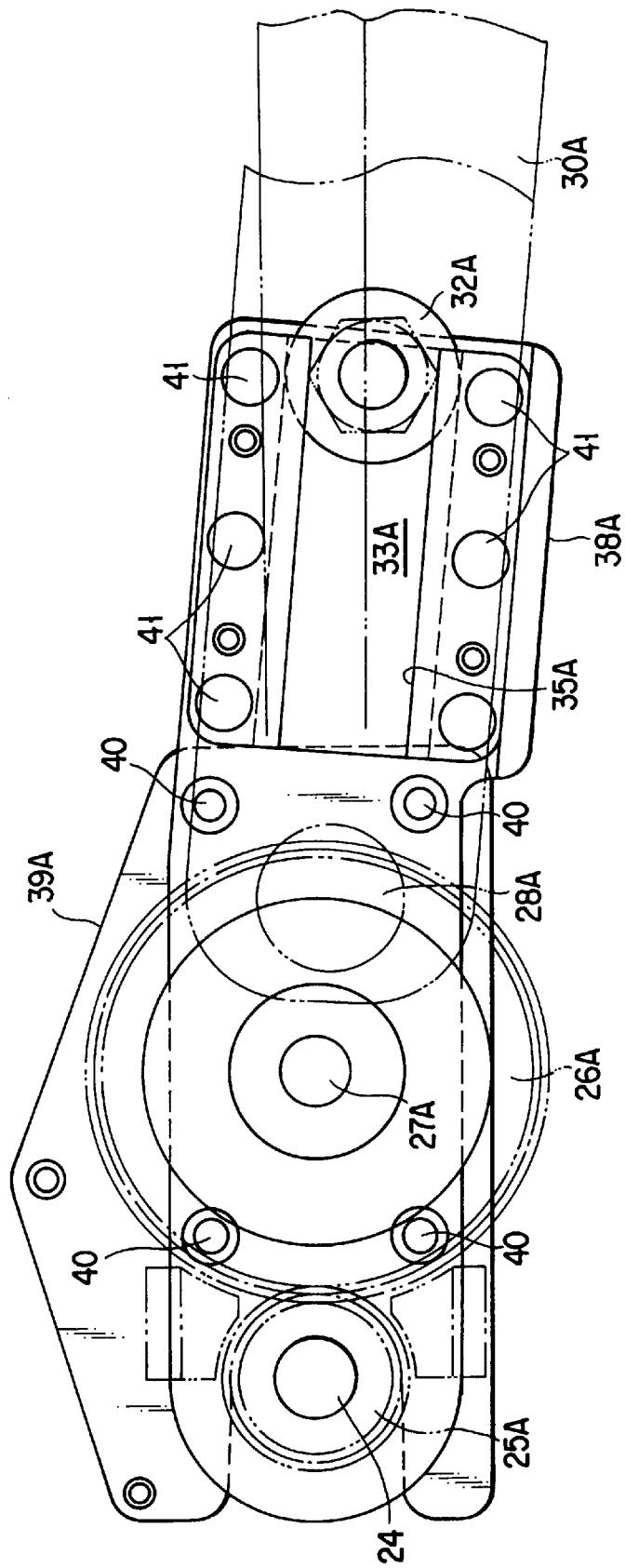
FIG. 3 is an enlarged side view showing part of the bicycle of FIG. 1.

Referring now to FIGS. 2 and 3, the propelling mechanism according to the embodiment shown in FIG. 1 will be described further in detail. FIG. 2 is a sectional view showing left- and right-hand propelling mechanisms with the rear wheel 12 removed, and FIG. 3 is an enlarged side view of the right-hand propelling mechanism shown in FIG. 1.

In FIG. 2, bearings 34A and 34B are fixed to the respective rear ends of pedal arms 30A and 30B. Also, right- and left-hand crank pins 28A and 28B, as the respective rotating shafts of the bearings 34A and 34B, are fixed to the rear ends of the arms 30A and 30B, respectively, so that their distal ends project.

The distal end portions of the crank pins 28A and 28B are rotatably coupled to the near peripheral portions of gears 26A and 26B, respectively, for eccentric rotation.

The gears 26A and 26B are rotatably mounted on shafts 27A and 27B by means of bearings 37A and 37B, respectively. The shafts 27A and 27B are mounted on support frames 38A and 38B, respectively, which are fixed on support frames 39A and 39B. The frames 39A and 39B are fixed on the horizontal frames 23A and 23B. The spindle or hub 24 is rotatably supported on the support frames 38A, 38B, 39A and 39B.

Fixed on the support frames 38A and 38B are support members 33A and 33B, respectively, which have their respective guide grooves 35A and 35B for guiding rollers 32A and 32B that are supported on the pedal arms 30A and 30B, respectively.

FIG. 3 is an enlarged side view showing the right-hand gear 26A and the support member 33A shown in FIGS. 1 and 2. The support frame 38A is fixed, by means of a plurality of fixing screws 40, to the support frame 39A, which is fixed on the right-hand horizontal frame 23B. The support member 33A having the guide groove 35A is firmly fixed to the frame 38A by means of a plurality of screws 41.

The vertical width of the guide groove 35A is substantially equal to the diameter of the roller 32A. As shown in FIG. 3, however, the width of a lateral opening of the groove 35A is a little shorter than the diameter of the roller 32A lest the roller 32A be disengaged from the groove 35A.

Referring to FIG. 2, the one-way clutch 45 is attached to the central portion of the spindle or hub 24, and the rear wheel 12 shown in FIG. 1 is mounted on the clutch 45.

In riding the bicycle constructed in this manner, a user sits on the saddle 21, put both his feet on the pedals 31A and 31B, individually, and first works, for example, the right-hand pedal 31A downward from the position shown in FIG. 1.

As the pedal 31A is thus depressed, the pedal arm 30A rotates clockwise around the roller 32A, so that the gear 26A is caused to rotate counterclockwise by the crank pin 28A. As the gear 26A rotates in this manner, the gear 25A is rotated clockwise, so that the spindle 24 rotates in the clockwise direction. Accordingly, the rear wheel 12 is rotated through the medium of the one-way clutch 45, whereupon the bicycle is propelled.

The rotation of the spindle 24 is transmitted to the left-hand gear 25B, so that the gear 26B rotates in the counterclockwise direction . Thereupon, the left-hand pedal arm 30B, which is coupled to the gear 26B by means of the crank pin 28B, rotates counterclockwise around the shaft of the roller 32B, so that the pedal 31B is lifted.

The crank pins 28A and 28B are mounted eccentrically on the gears 26A and 26B so as to have a phase difference of just 180 degrees from the shafts 27A and 27B, respectively. When the pedal 31A reaches the lowest position in its stroke in the path X, therefore, the pedal 31B on the opposite side reaches the highest position in its stroke.

As the pedal 31B is then depressed by the left foot in this state, the pedal arm 30B rotates clockwise around the roller 32B, so that the gear 26B is caused to rotate counterclockwise by the crank pin 28B. As the gear 26B rotates in this manner, the gear 25B is rotated clockwise, so that the spindle 24 rotates in the clockwise direction, and therefore, the bicycle is propelled.

Thus, the path of motion of each of the pedals 31A and 31B has the form of a closed semicircular curve, as represented by the curve X. This semicircular path X is so flat that the user can work the pedals 31A and 31B substantially by only moving his feet up and down. According to this embodiment, the user's feet are reciprocated slightly aslant between upper front and lower rear positions, just as in stamping on the level ground. Unlike rotatory motions of a user's legs pedaling a conventional bicycle, therefore, the leg motion of the user on the bicycle of this embodiment is a very natural up-and-down motion, which involves no power loss and fatigues the user less.

Unlike the conventional bicycle, moreover, the bicycle of this embodiment uses no chain, so that its maintenance is easy.

Although the pedals 31A and 31B shown in FIG. 1 are designed so as to move clockwise along the path X, they may alternatively be arranged so as to rock in the counterclockwise direction. This arrangement can be easily realized by interposing an additional gear between the gears 26A and 25A.

In working the pedals 31A and 31B so as to rock them counterclockwise along the path X, the user's feet are reciprocated more aslant between upper front and lower rear positions than in the case of the embodiment of FIG. 1, and this reciprocation is similar to the motion of the feet of a brisk walker on the level ground. Unlike rotatory motions of a user's legs pedaling a conventional bicycle, therefore, the leg motion of the user on the bicycle of this embodiment resembles a very natural up-and-down motion of a walker's legs, so that it involves no power loss and fatigues the user less.

According to the embodiment shown in FIGS. 1 to 3, a propelling device is designed on the basis of the pedal arms 30A and 30B as inner fulcrum type leverages in which the rollers 32A and 32B as moving fulcrums are arranged between the pedals 31A and 31B as points of force application and the crank pins 28A and 28B as points of action. Alternatively, however, the propelling mechanism may be designed on the basis of outer fulcrum type leverages that use one end of each pedal arm as a fulcrum.

Figure 4:
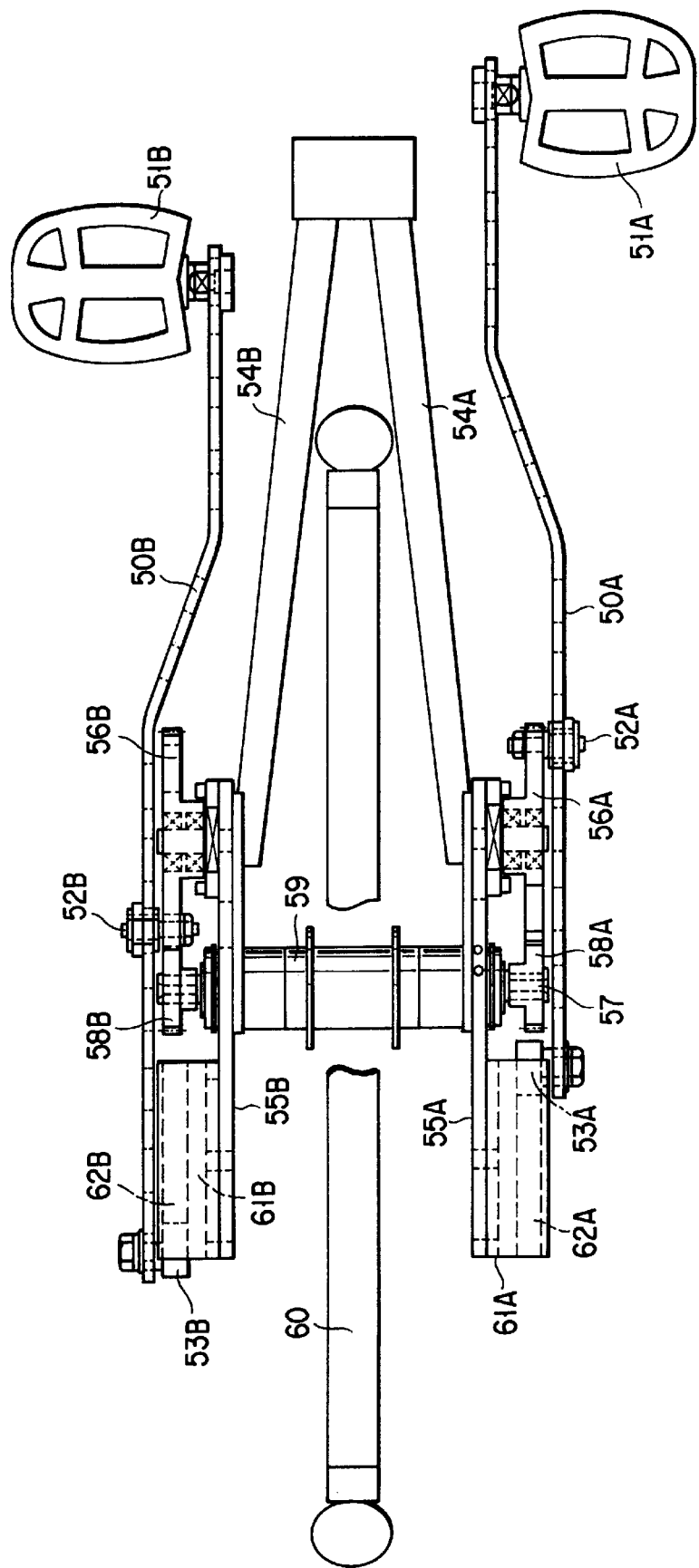
FIG. 4 is a detailed plan view of a drive mechanism at a rear portion of a bicycle according to another embodiment of the invention.

FIG. 4 is a plan view showing another embodiment of the invention, in which a propelling device may be designed on the basis of outer fulcrum type leverages in which rollers 53A and 53B as the respective moving fulcrums of pedal arms 50A and 50B are arranged outside pedals 51A and 51B as points of application and crank pins 52A and 52B as points of action, that is, on those ends of the arms 50A and 50B on the side opposite from the pedals 51A and 51B.

Since other members of this embodiment are arranged in the same manner as those of the embodiment shown in FIGS. 1 to 3, they will now be described only briefly. The crank pins 52A and 52B are fixed individually to eccentric positions on gears 56A and 56B that are rotatably supported on support frames 55A and 55B. The frames 55A and 55B are fixed to rear frames 54A and 54B, respectively. The respective intermediate portions of the pedal arms 50A and 50B are rotatably coupled to the pins 52A and 52B, respectively.

The gears 56A and 56B are caused to engage gears 58A and 58B, respectively, fixed on a hub spindle 57 that is supported on the support frames 55A and 55B. A rear wheel 60 is mounted on the spindle 57 by means of a one-way clutch 59.

The rollers 53A and 53B, which are mounted on the rear ends of the pedal arms 50A and 50B, respectively, are held so as to be movable back and forth along guide grooves 62A and 62B in support frames 61A and 61B that are fixed on the support frames 55A and 55B, respectively.

In FIG. 4, the pedal 51B is situated in its uppermost position, and the pedal 51A in its lowermost position. As in the case shown in FIG. 1, these two pedals 51A and 51B will be on the same height level in positions just in the middle of their respective ranges of vertical movement.

When the pedal 51B is then worked down, the pedal arm 50A rotates clockwise around the axis of the roller 53B, and the gear 56B is rotated counterclockwise by means of the crank pin 52B. Thereupon, the gear 58B or the spindle 57 rotates in the clockwise direction, thereby applying a rightward propulsive force to the bicycle.

As the spindle 57 rotates, on the other hand, the gear 58A rotates in the clockwise direction, so that the pedal arm 50A rotates counterclockwise around the axis of the roller 53A and is lifted. When the pedal 51A is worked in a position beyond its top point, that is, in a position such that the crank pin 52A is situated behind the axis of the gear 56A, the pedal arm 50A is worked and is rotated clockwise around the axis of the roller 53A, so that the gear 58A is forced to rotate in the clockwise direction, thereby applying a propulsive force to the bicycle.

Thereafter, the bicycle can be run efficiently and steadily in the same manner as the one according to the embodiment shown in FIG. 1 by alternately working the pedals 51A and 51B. In the embodiment shown in FIG. 4, as seen from the above description, the rollers 53A and 53B move frontward and backward, so that the trace of the movement indicates a counterclockwise rotation along a path similar in the path X of FIG. 1, while being opposite in direction to the rotation described in connection with the embodiment of FIG. 1. In working the pedals 51A and 51B so as to rock them counterclockwise along the path, therefore, a user's feet are reciprocated between upper and lower positions, and this reciprocation is similar to the motion of the feet of a brisk walker on the level ground. Unlike rotatory motions of a user's legs pedaling a conventional bicycle, therefore, the leg motion of the user on the bicycle of this embodiment resembles a very natural up-and-down motion of a walker's legs, so that it involves no power loss and fatigues the user less.

Figure 5A:
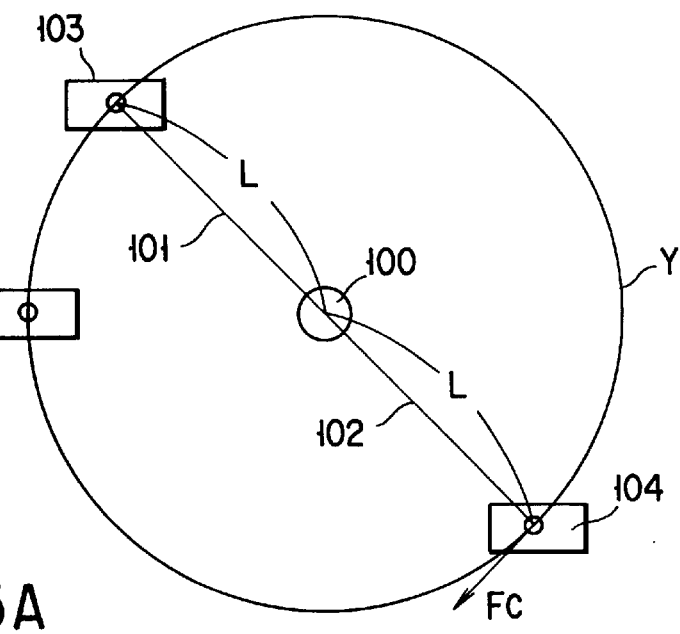
FIGS. 5A and 5B are diagrams for illustrating each torque generated in a conventional bicycle and the bicycle according to the embodiment shown in FIG. 4.
Figure 5B:
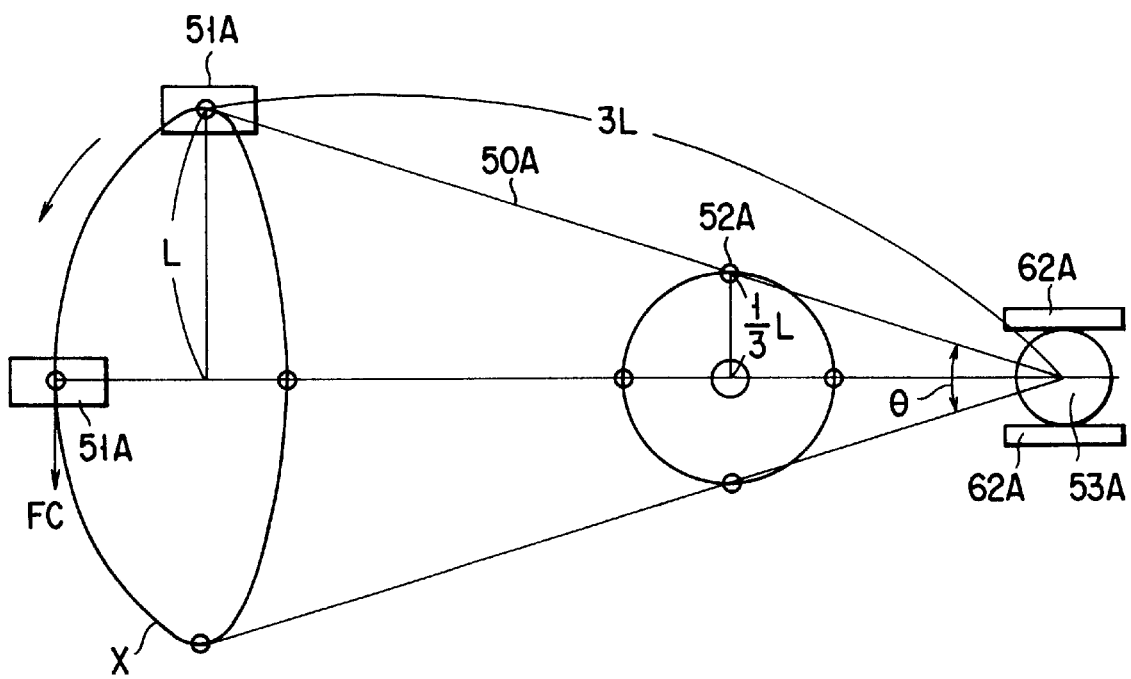

Referring now to FIGS. 5A and 5B, the respective operations of the propelling mechanism using the moving fulcrum type leverage according to the present invention and the conventional bicycle propelling mechanism will be analyzed comparatively.

FIG. 5A shows the path Y of action of pedals of a conventional bicycle. In this bicycle, pedals 103 and 104 are attached to the distal ends of pedal arms 101 and 102, respectively, which are arranged with a phase difference of 180 degrees around a rotating shaft 100 of a chain gear (not shown).

If the length of each of the arms 101 and 102 and a force applied to the pedal 104 in the direction of a tangent to the path Y of clockwise rotation are L and Fc, respectively, in FIG. 5A, a torque T0 in the center shaft 100 is $$T0 = L \cdot Fc.$$

FIG. 5B schematically shows an arrangement of the outer fulcrum type leverage according to the embodiment shown in FIG. 4. Here let it be supposed that the length of the pedal arm 50A is 3L, the operating angle of the arm 50A is θ, and the rectilinear distance between the center of the path X and the axis of the pedal 51A, as the point of application, in a position reached when the pedal 51A is rotated for just θ/2 is L, which is equal to the length of each conventional pedal arm. Thereupon, if the same force Fc for the conventional case is applied in the direction of a tangent to the path X of motion of the pedal 51A, a torque T in the shaft of the roller 53A, the moving fulcrum of the pedal arm 50A, is $$T = 3L \cdot Fc,$$

which indicates the generation of a force three times as large as that of the conventional bicycle with the same pedal stroke.

The crank pin 52A can be located on the pedal arm 50A in a position such that the radius of a circle described by the pin 52A is ⅓L, for example. If the length L of each pedal arm of the conventional bicycle is 160 mm, for example, the length of the pedal arm 50A according to the embodiment of FIG. 4 is 3×160=480 mm. Thus, the arm 50A can be mounted on the frame of a regular-size bicycle with good allowance. Naturally, however, the pedal arm 50A may be made longer so that a greater torque can be generated.

In the case of the conventional bicycle, the propulsive force can be applied by working each pedal within an angular range of about 120 degrees, from a position in which the pedal is situated just ahead of the top position of its path, e.g., the 2-o'clock position, to the bottom or 6-o'clock position.

According to the present invention, in contrast with this, the propulsive force can be applied highly efficiently by working each pedal throughout a range of about 180 degrees from the top position to the bottom. Moreover, the pedals are always worked downward and their movement involves fewer horizontal components than in the conventional case, so that the bicycle can be propelled more efficiently.

FIGS. 6 and 7 show alternative embodiments of the present invention.

Figure 6A:
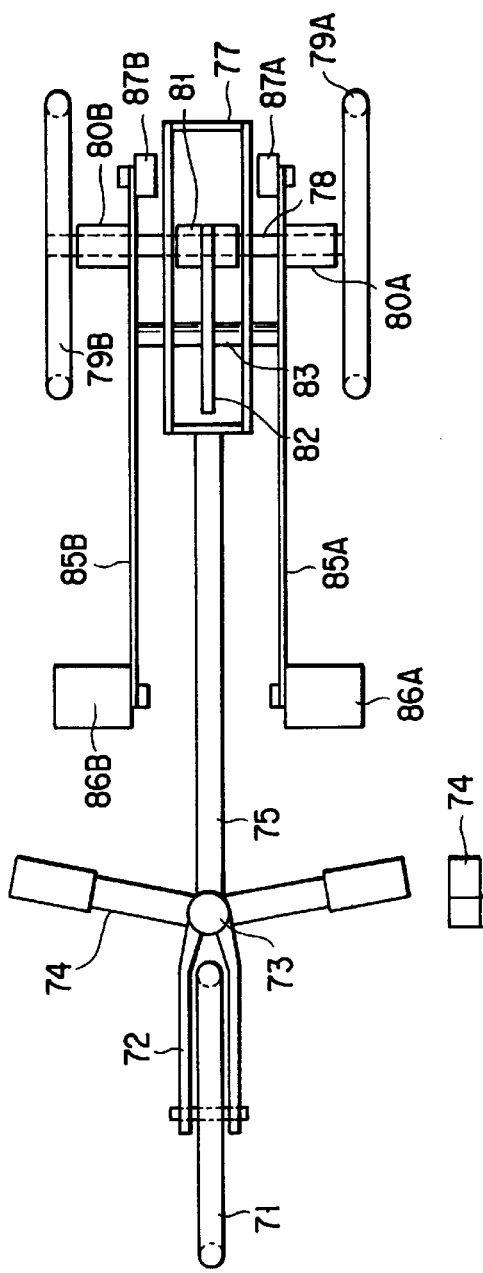
FIGS. 6A and 6B are a plan view and a side view, respectively, showing an alternative embodiment of the invention.
Figure 6B:
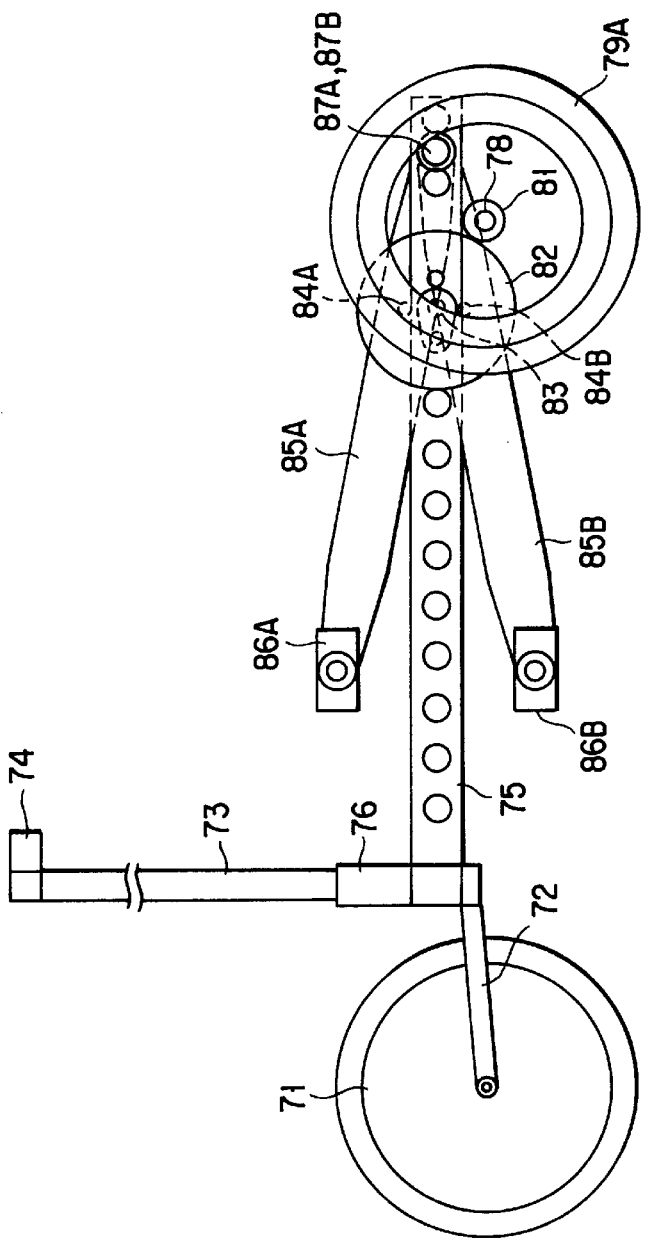

In the embodiment shown in FIGS. 6A and 6B, as in the embodiment of FIG. 4, a propelling device is composed of an outer fulcrum type leverage. FIG. 6A is a plan view, and FIG. 6B is a side view. A cycle according to this embodiment is a simple tricycle. Referring to FIGS. 6A and 6B, a front wheel 71 is rotatably mounted on the distal end portion of a bifurcated front-wheel frame 72, which is fixed to the lower end of a handlebar frame 73.

A handlebar 74 is attached to the upper end of the handlebar frame 73, and is rotatably held in a substantially vertical position by a joint portion 76 formed on the front end of a center frame 75. A rectangular box-shaped frame 77 is fixed to the rear end of the center frame 75. A rear-wheel spindle 78 is rotatably supported on the frame 77 so as to extend at right angles to the frame 75.

A pair of rear wheels 79A and 79B are mounted individually on the opposite ends of the rear-wheel spindle 78 by means of bearings 80A and 80B, respectively. As in the foregoing embodiments, a rear-wheel gear 81 is attached to an intermediate portion of the spindle 78 by means of a one-way clutch, and a driving gear 82 is in mesh with the gear 81. The driving gear 82 is rotatably mounted on the box-shaped frame 77 by means of a rotating shaft 83, which extends parallel to the rear-wheel spindle 78.

A pair of crank pins 84A and 84B are fixed individually in eccentric positions with a phase difference of 180 degrees on either side of the shaft 83 of the driving gear 82. The respective intermediate portions of pedal arms 85A and 85B are mounted for rotation on the pins 84A and 84B, respectively.

Pedals 86A and 86B are mounted for rotation on the distal ends of the pedal arms 85A and 85B, respectively, while rollers 87A and 87B are supported on the corresponding rear ends. These rollers 87A and 87B are supported individually by means of support members (not shown) that are constructed in the same manner as the support frames 61A and 61B with the guide grooves 62A and 62B according to the embodiment shown in FIG. 4.

The cycle according to the embodiment shown in FIGS. 6A and 6B is a so-called tricycle, and is not provided with any part that is equivalent to the saddle 21 used in the embodiment shown in FIG. 1. Accordingly, this tricycle should be used rather for cycling as sport or as a toy vehicle than for ordinary service.

In operation, a user firmly grasps the handlebar 74 in both his hands, and steps on the pedals 86A and 86B alternately by both his feet. As a result, the driving gear 82 is rotated continuously as in the embodiment of FIGS. 1 to 4, so that the rear wheels 79A and 79B rotate to propel the tricycle.

Figure 7A:
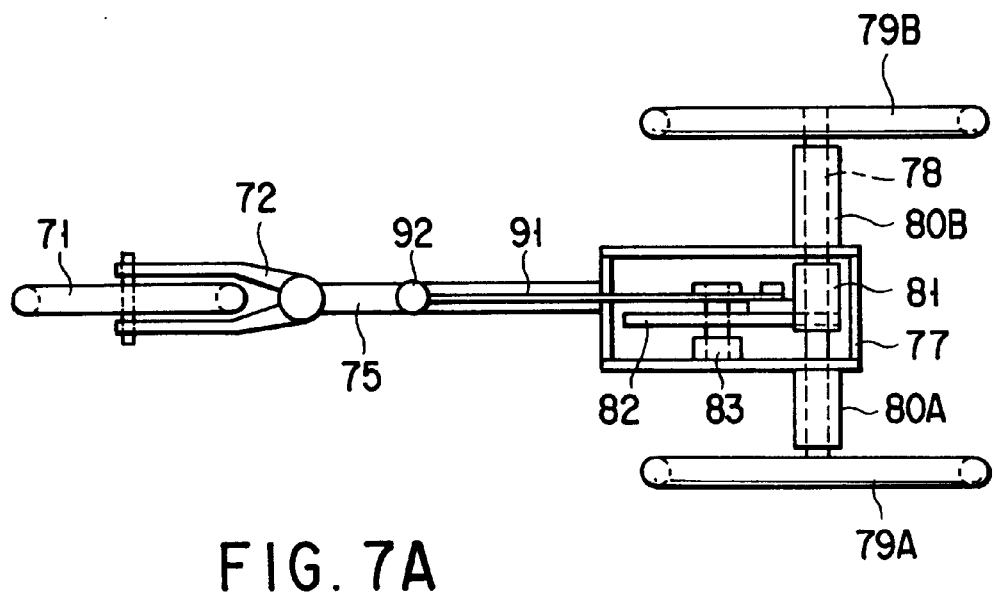
FIGS. 7A and 7B are a plan view and a side view, respectively, showing another alternative embodiment of the invention.
Figure 7B:
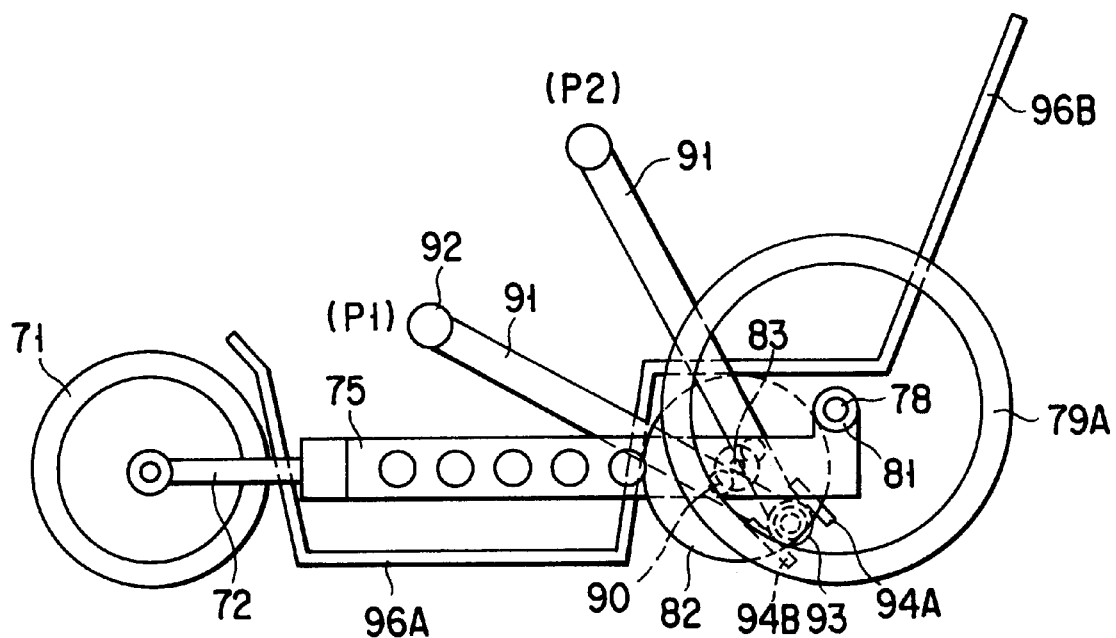

FIGS. 7A and 7B show a tricycle according to another alternative embodiment of the invention, which is simpler than the one shown in FIGS. 6A and 6B. In these drawings, like reference numerals refer to corresponding portions throughout the views. Referring to FIGS. 7A and 7B, a rear-wheel gear 81, which is attached to an intermediate portion of a hub spindle 78 between a pair of rear wheels 79A and 79B by means of a one-way clutch (not shown), is caused to mesh with a driving gear 82 that is rotatably mounted on a box-shaped frame 77 by means of a rotating shaft 83.

A crank pin 90 is fixed eccentrically to the driving gear 82, and an intermediate portion of an operating handle 91 is rotatably mounted on the pin 90. A handgrip 92 is attached to the distal end portion of the handle 91, while a roller 93 is supported on the rear end portion of the handle. The roller 93 is designed so as to be guided between a pair of guide plates 94A and 94B as it rotates obliquely upward along the course of the tricycle vehicle. The plates 94A and 94B are fixed on the box-shaped frame 77.

As shown in FIG. 7B, moreover, a step portion 96A and a seat portion 96B continuous therewith are mounted on a center frame 75 between a front wheel 71 and the rear wheels 79A and 79B. In FIG. 7A, illustration of these portions 96A and 96B is omitted.

In using the tricycle according to the embodiment shown in FIGS. 7A and 7B, a user first sits on the seat portion 96B, puts both his feet on the step portion 96A, and grasps the handgrip 92 on the distal end portion of the operating handle 91 in one or both of his hands. If the handle 91 is pulled up clockwise when it is in a position P1 shown in FIG. 7B, for example, a force is applied so that the crank pin 90 moves clockwise around the shaft 83. As this is done, the driving gear 82 is rotated in the clockwise direction.

As a result, the rear-wheel gear 81, which is in mesh with the driving gear 82, is rotated in the counterclockwise direction, whereupon the tricycle advances to the left of FIGS. 7A and 7B.

If the operating handle 91 is pushed down counterclockwise when it reaches a position P2 shown in FIG. 7B, thereafter, a force is applied so that the crank pin 90 moves clockwise around the shaft 83. As this is done, the driving gear 82 is rotated in the clockwise direction.

As the operating handle 91 is reciprocated between the points P1 and P2 in this manner, the rear wheels 79A and 79B are driven continuously, so that the tricycle continues to advance.

Instead of being designed for hand operation, the operating handle 91 may be designed for foot operation with the same result. In this case, the handle 91 is depressed by a foot, and may be returned to the position P2 by means of a combination of a one-way clutch and a return spring. This mechanism is self-explanatory and the detail thereof may be omitted here.

Figure 9A:
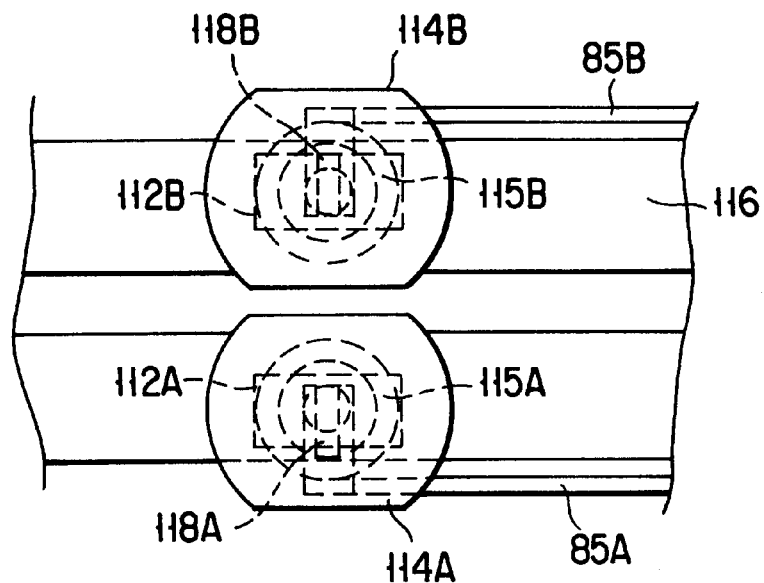
FIGS. 9A and 9B are an enlarged plan view and an enlarged side view, respectively, showing a pedal portion according to the embodiment shown in FIGS. 8A and 8B.
Figure 9B:
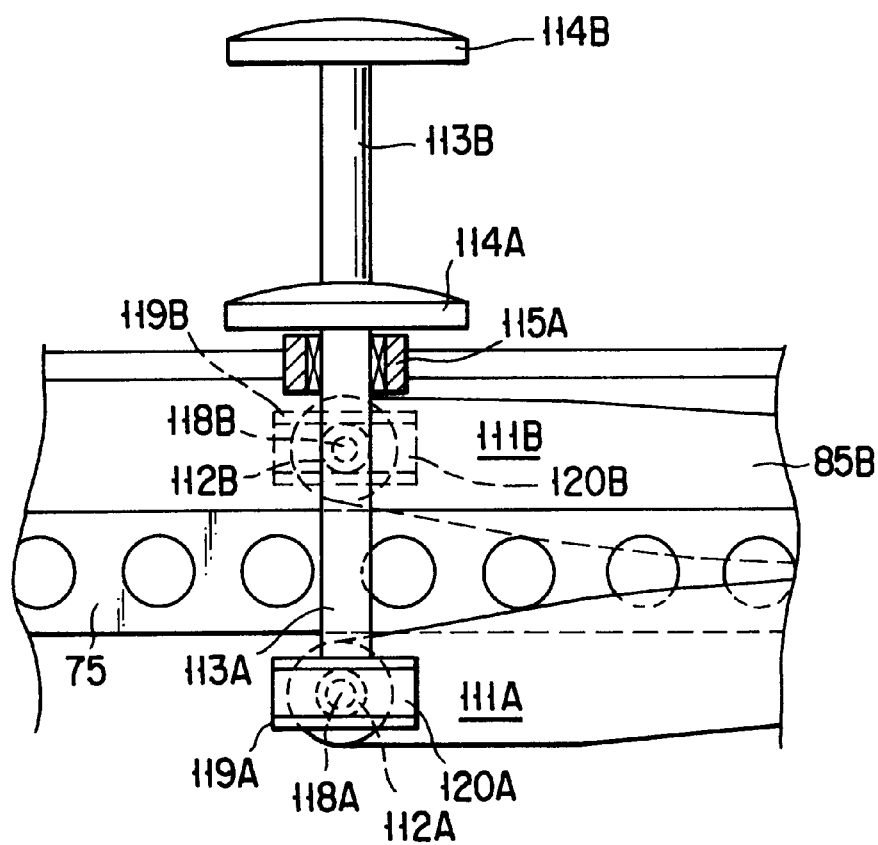
Figure 10:
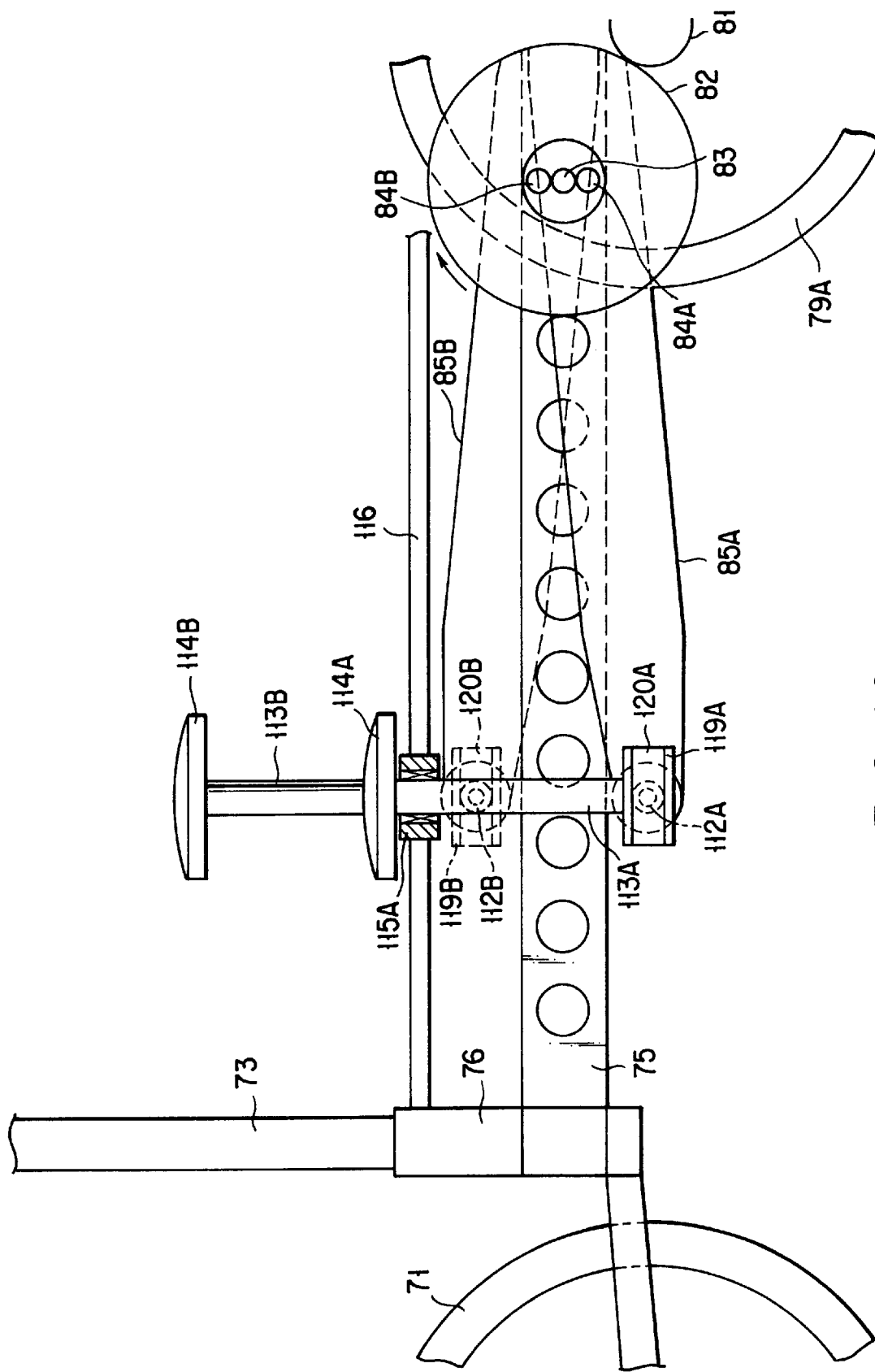
FIG. 10 is a side view showing the principal part of the embodiment shown in FIGS. 8A and 8B.

FIGS. 8A and 8B are a plan view and a side view, respectively, showing a tricycle according to a further embodiment of the invention or a modification of the embodiment shown in FIGS. 6A and 6B. FIGS. 9A and 9B are enlarged plan and side views, respectively, of a pedal portion of the embodiment of FIGS. 8A and 8B, and FIG. 10 is a side view showing the principal part of this tricycle. In FIGS. 6A to 10, like reference numerals refer to like portions throughout the views.

Referring to FIGS. 8A and 8B, rollers 112A and 112B, which constitute parts of moving application-point regulators 111A and 111B, respectively, are rotatably supported, in place of the pedals 86A and 86B according to the embodiment shown in FIGS. 6A and 6B, on the distal ends of pedal arms 85A and 85B, respectively. The regulators 111A and 111B are fixed to the respective lower end portions of their corresponding piston rods 113A and 113B, and pedal plates 114A and 114B are fixed to their respective upper end portions so as to extend substantially at right angles to the axis of the rods 113A and 113B. The piston rods 113A and 113B are supported on vertical motion bearings 115A and 115B, respectively, for free vertical movement along a straight line. These bearings 115A and 115B are fixed on a support frame 116, which is fixed between a rectangular box-shaped frame 77 and a joint portion 76 formed on the front end of a center frame 75.

Referring now to FIGS. 9A and 9B, an arrangement of the moving application-point regulators 111A and 111B shown in FIGS. 8A and 8B will be described in detail.

In FIGS. 9A, 9B and 10, the rollers 112A and 112B are supported for rotation on the distal ends of pedal arms 85A and 85B by means of shafts 118A and 118B, respectively. These rollers 112A and 112B are fitted, respectively, in horizontal guide grooves 120A and 120B that are formed in guide plates 119A and 119B, respectively. The plates 119A and 119B are fixed to the respective lower ends of their corresponding piston rods 113A and 113B. The rollers 112A and 112B and the guide plates 119A and 119B, having their respective guide grooves 120A and 120B, constitute the moving application-point regulators 111A and 111B.

Since other portions of this embodiment are arranged in the same manner as those of the embodiment shown in FIGS. 6A and 6B, like reference numerals are used to designate those portions, and a detailed description of those portions is omitted herein.

Referring now to FIGS. 8 to 10, the operation of the tricycle according to the present embodiment will be described. A user firmly grasps a handlebar 74 in both his hands, and steps on the pedal plates 114A and 114B alternately by his left and right feet, respectively. If the pedal plate 114B is depressed from the position shown in these drawings by the user's right foot, for example, the piston rod 113B is forced down to lower the guide plate 119B that is fixed to the lower end of the rod 113B. Thereupon, a downward force acts on the roller 112B that is fitted in the guide groove 120B, thereby subjecting the pedal arm 85B to a rotatory force in the counterclockwise direction around a roller 87B that constitutes a moving fulcrum regulator.

Thereupon, a gear 82 is rotated clockwise around a shaft 83 by means of a crank pin 84B that is fixed to an intermediate portion of the pedal arm 85B, so that a gear 81, which is connected directly to rear wheels 79A and 79B, is rotated in the counterclockwise direction. As a result, the tricycle advances. As the crank pin 84B rotates clockwise around the shaft 83, the roller 112B moves backward in its corresponding guide groove 120B. At the same time, the roller 87B, which is mounted on the rear end of the pedal arm 85B, also moves backward in a guide groove (not shown) that constitutes the moving fulcrum regulator. Since the guide plate 119B having the guide groove 120B is fixed to the lower end of the piston rod 113B, however, a force to depress the pedal plate 114B, thereby lowering the rod 113B, can be transmitted to the pedal arm 85B without any loss even though the roller 112B moves backward in the guide groove 120B.

When the pedal arm 85B is depressed to the illustrated position of the other pedal arm 85A, the arm 85A is caused to ascend to the illustrated position of the arm 85B by the crank pin 84A.

As this is done, the roller 112A, which is supported on the distal end of the pedal arm 85A, moves forward in its corresponding guide groove 120A. At the same time, a roller 87A, which is mounted on the rear end of the pedal arm 85A, also moves forward in a guide groove (not shown) that constitutes the moving fulcrum regulator. Since the guide plate 119A having the guide groove 120A is fixed to the lower end of the piston rod 113A, however, the roller 112A moves forward in the guide groove 120A, and the pedal arm 85A rotates in the clockwise direction, whereupon the piston rod 113A, fitted with the pedal plate 114A, easily ascends without any resistance.

When the pedal plate 114A reaches the position of the pedal plate 114B as illustrated, the user then stamps it plumb down by his left foot. As a result, the pedal arm 85A rotates in the counterclockwise direction this time, so that the gear 82 is rotated clockwise by the crank pin 84A. Thereupon, the tricycle is caused to advance by the gear 81.

As a result, the driving gear 82 is rotated continuously, so that the rear wheels 79A and 79B rotate. Thus, the tricycle continues to be driven forward.

It is to be understood that a transmission gear unit may be incorporated as a gear unit coupled to the spindle of the rear wheel according to any of the embodiments described above. In this case, a change lever of the gear unit should only be attached to the saddle or handlebar of the cycle. Also, brake levers should be arranged in combination with the handgrips on the handlebar.

Figure 11:
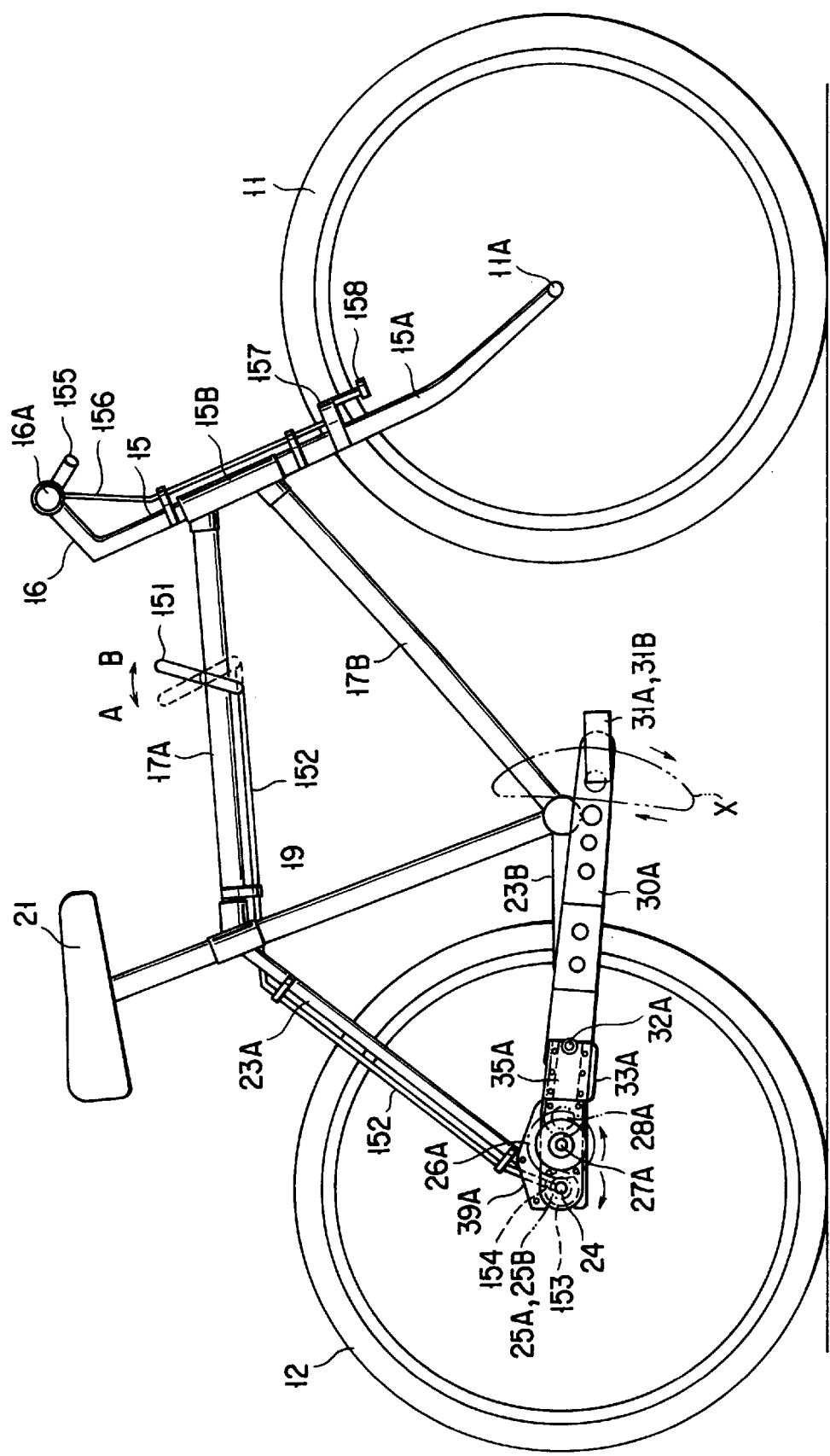
FIG. 11 is a general side view showing an additional embodiment of the invention.
Figure 12:
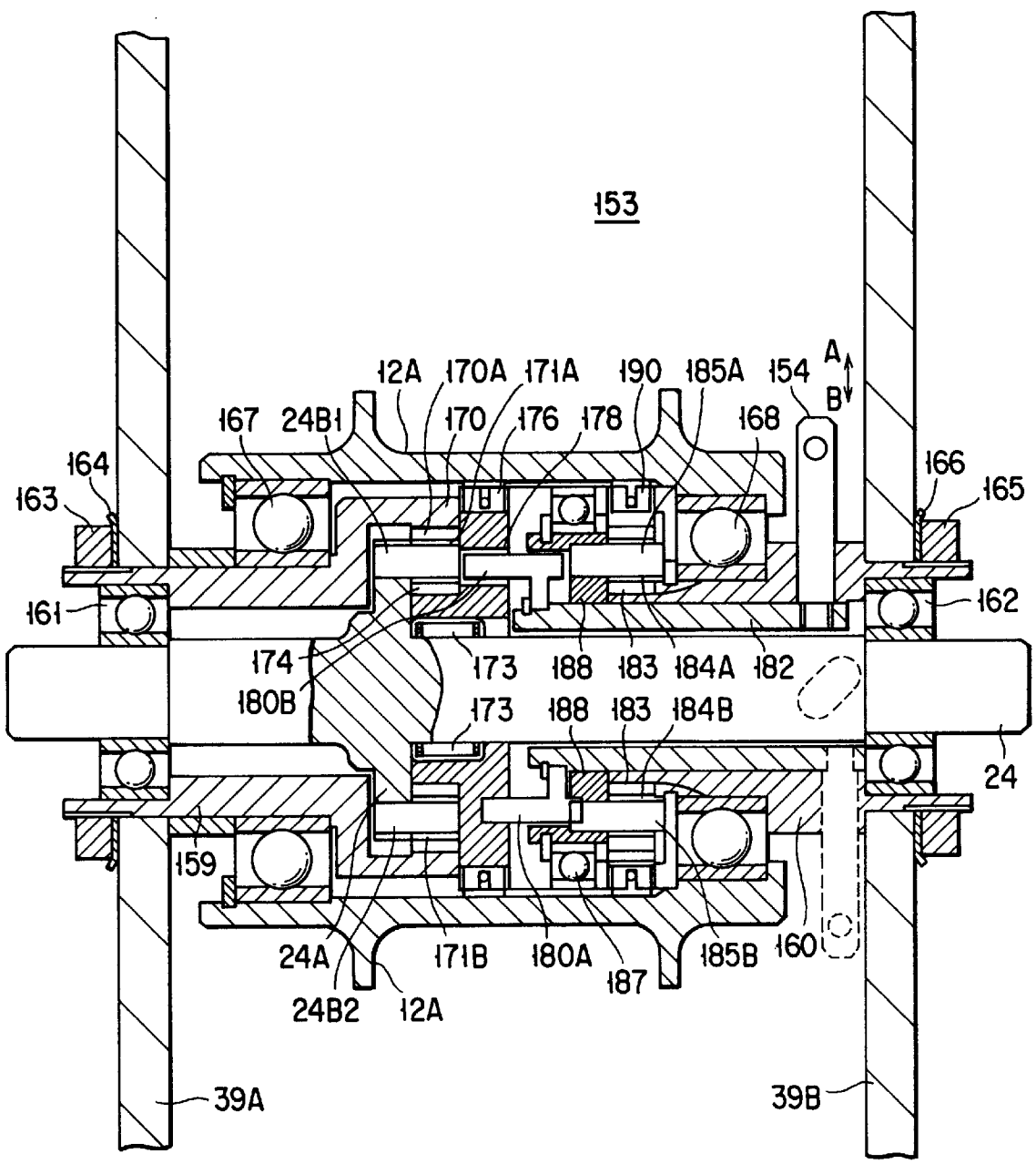
FIG. 12 is a sectional view showing the principal part of the embodiment shown in FIG. 11.

Referring now to FIGS. 11 to 13, a bicycle according to an additional embodiment of the invention furnished with a transmission gear unit will be described.

FIG. 11 shows a general arrangement of this embodiment. Basically, the bicycle of this embodiment is constructed in the same manner as the one shown in FIG. 1, so that like reference numerals refer to like portions throughout the views, and a detailed description of those portions is omitted herein.

In FIG. 11, a substantially central portion of a change lever 151 is supported on a horizontal center frame 17A for longitudinal rocking motion. The lower end of the lever 151 is connected to a transmission actuator 154 of a transmission gear unit 153 on a hub spindle 24 of a rear wheel 12 by means of a link mechanism 152 that is penetrated by a cable 152A (FIGS. 13A and 13B) in the center.

When the change lever 151 is latched in a position B of FIG. 11, the gear position is a normal position for level-road cycling. A position A corresponds to a gear position for slope climbing, for example. FIG. 11 also shows a brake lever 155 that is mounted on a handlebar 16 so as to be situated in front of a handgrip 16A. The lever 155 is connected to a pair of brake pads 158 of a brake unit 157 by means of a link mechanism 156. The brake pads 158 can be pressed against a frame 11A of a front wheel 11 to brake it by squeezing the brake lever 155. A similar brake mechanism may be provided for the rear wheel 12. Since this brake unit is a conventional one, a further description of it is omitted herein.

FIG. 12 is a sectional view showing an arrangement of the transmission gear unit 153, in which the spindle 24 is supported between a pair of support frames 39A and 39B by means of bearings 161 and 162 that are fitted in bearing frames 159 and 160, respectively. The spindle 24, like that of the embodiment shown in FIG. 1, is driven by means of gears 25A and 25B by working the pedals 31A and 31B. For simplicity of illustration, however, this drive mechanism is not shown in FIG. 12.

The bearing 161 is fixed in the bearing frame 159 for use as a link gear that is fixed to the support frame 39A like a cantilever by means of a nut 163 and a washer 164. Likewise, the bearing 162 is fixed in the bearing frame 160 for use as a sun gear that is fixed to the support frame 39B like a cantilever by means of a nut 165 and a washer 166.

Further bearings 167 and 168 are fixed on the bearing frames 159 and 160, respectively, and a spindle frame 12A of the rear wheel 12, for use as a gear case, is rotatably fitted on the bearings 167 and 168.

A free end of the bearing frame 159 has a large-diameter portion 170 having a cranked profile, and an internal teeth 170A are formed on the inside of the large-diameter portion 170. On the other hand, a flange portion 24A is formed on that intermediate portion of the hub spindle 24 which corresponds to the large-diameter portion 170. Inside the peripheral end portion of the flange portion 24A, a pair of shafts 24B1 and 24B2 are fixed parallel to the spindle 24, in positions diametrically symmetrical with respect to the spindle 24. Supported on the shafts 24B1 and 24B2, respectively, are planet gears 171A and 171B that are in mesh with the internal teeth 170A. It is to be understood that the planet gears are not limited to two in number, and may alternatively be one or three or more.

The planet gears 171A and 171B are arranged so as to be in mesh with a sun gear 174 that is rotatably mounted on the spindle 24 by means of a bearing 173. The sun gear 174 is coupled to the spindle frame 12A by means of a one-way clutch 176. When the gear 174 is in its normal position, the rotation of the spindle 24 is transmitted t o the rear wheel 12 via this route.

The sun gear 174 is formed having a plurality of horizontal holes 178, in a plurality of which pins 180A and 180B are inserted engagedly, and rotate together with the gear 174.

The pins 180A and 180B are connected to the transmission actuator 154 shown in FIG. 11 by means of a slide bush mechanism 182, and are located so as to be movable between positions A and B along the spindle 24. The mechanism 182 will be described later.

On the other hand, another sun gear 183 is formed on the outer peripheral portion of the other bearing frame 160. Two planet gears 184A and 184B are supported on shafts 185A and 185B, respectively, so as to be mesh with the sun gear 183.

The shafts 185A and 185B are fixed on a rotating body 188 that is rotatably mounted on the spindle frame 12A by means of a bearing 187. The shafts 185A and 185B and the pins 180A and 180B are located substantially at equal distances from the center of the spindle 24. Accordingly, they come to engage one another when the pin 180B situated above the spindle 24, as shown in FIG. 12, is slid to the position of the pin 180A below the spindle 24. Thus, FIG. 12 shows two different shift positions at the same time for ease of illustration.

When the change lever 151 is moved from the position B to the position A of FIG. 11, it is latched in this position by means of a ratchet mechanism (not shown). Also, the pins 180 move from the position of the pin 180B to the pin 180A, whereupon the rotation of the spindle 24 is transmitted to the shafts 185A and 185B through the pin 180A, so that the planet gears 184A and 184B are rotated. Since the sun gear 183 is fixed at this point of time, an outer ring gear 190 is rotated, and this rotation is transmitted to the spindle frame 12A through a one-way clutch 192.

A gear ratio for the second planet gears 184A and 184B is higher than that for the first planet gears 171A and 171B. Accordingly, the second planet gears 184A and 184B rotate in advance of the first planet gears 171A and 171B, so that the bicycle runs at low speed if the second planet gears 184A and 184B are rotated as the spindle 24 rotates.

Figures 13A, 13B:
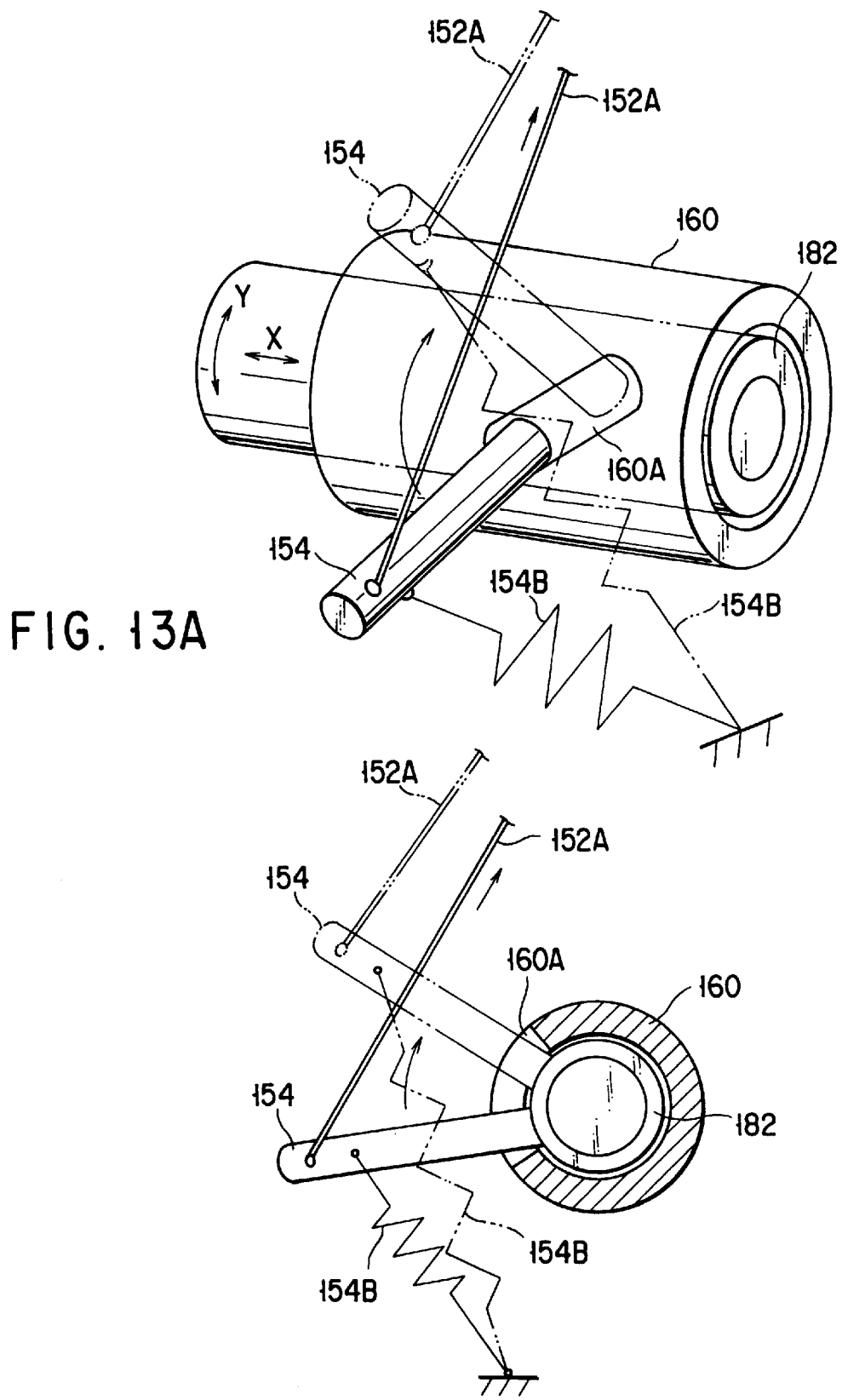
FIGS. 13A and 13B are enlarged views showing a part of FIG. 12.

Referring now to FIGS. 13A and 13B, the slide bush mechanism 182 will be described. A shift of the change lever 151 between the positions A and B is transmitted to the transmission actuator 154 by means of the cable 152A that passes through the center of the link mechanism 152. The actuator 154 is vertically fixed on the slide bush mechanism 182 that is inserted in the bearing frame 160, and is continually pulled downward by a coil spring 154B that is anchored to its distal end portion. Thus, the actuator 154 is held against the lower end of a guide hole 160A that is formed in the frame 160 at a given angle of inclination to the axis thereof. This position is the normal running gear position B.

When the change lever 151 is shifted from the normal position B to the low-speed position A, the cable 152A is pulled so that the actuator 154 moves upward against the tensile force of the coil spring 154B. In this position, the actuator 154 is fixed by means of the ratchet mechanism that is attached to the change lever 151.

As a result, the slide bush mechanism 182 rotates in the direction of arrow Y shown in FIGS. 13A and 13B, and also moves in the direction of arrow X. Thereupon, the pins 180A and 180B that are formed on the distal end of the mechanism 182 move from the position in the upper half of FIG. 12 to the position in the lower half. In this manner, the transmission gear engagement is changed.

Thus, the transmission gears can be changed by shifting the change lever 151 of the transmission gear unit 153 between the positions A and B.

It is to be understood, moreover, that the leverage of each pedal arm, a lever member for substantially changing the gear ratio according to the invention, can be changed by shifting the fulcrum position, for example.

According to the present invention, as described in detail herein, there may be provided a cycle furnished with a safe, light-weight moving fulcrum type leverage, which can highly efficiently utilize a user's power without the use of a chain.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A bicycle comprising:

a frame including a handlebar;

first and second wheels mounted individually on front and rear portions of the frame for rotation;

first and second movable support rollers rollable along an inside of first and second guide grooves, respectively;

first and second lever members extending in a horizontal direction and having movable fulcrums supported individually on the first and second movable support rollers, said fulcrum being movable with rolling of said movable support rollers in said respective guide grooves so that contact points between outer surfaces of said rollers and said respective guide grooves move as the rollers roll in said respective guide grooves;

first and second pedals formed on respective points of action of the first and second lever members, respectively;

first and second crank devices connected to the respective points of action of the first and second lever members and coupled to an output shaft, the first and second crank devices being separated with a phase difference of 180 degrees from each other with respect to a rotation angle of the output shaft; and a gear device coupling the output shaft to an axle of one of the first and second wheels.

2. A bicycle according to claim 1, further comprising a brake device for limiting the rotation of at least one of the first and second wheels.

3. A bicycle according to claim 1, wherein the axle of said wheel coupled to the output shaft is provided with a one-way clutch.

\* \* \* \* \*